Sept. 30, 1941. R. C. PIERCE 2,257,648
REINFORCING ELEMENT AND METHOD OF MANUFACTURE
Filed Nov. 18, 1939 2 Sheets-Sheet 2
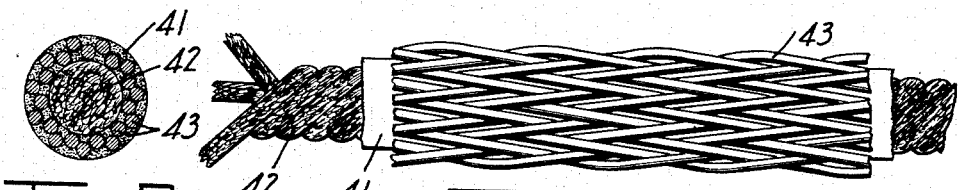
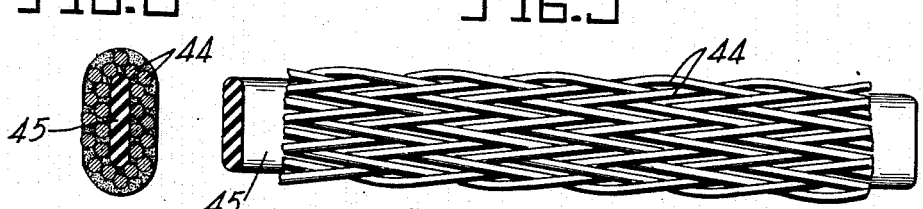
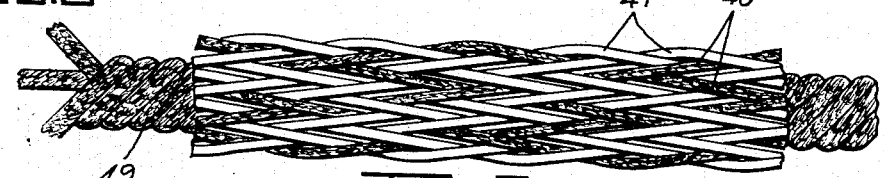
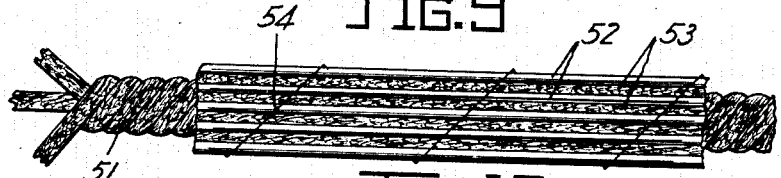
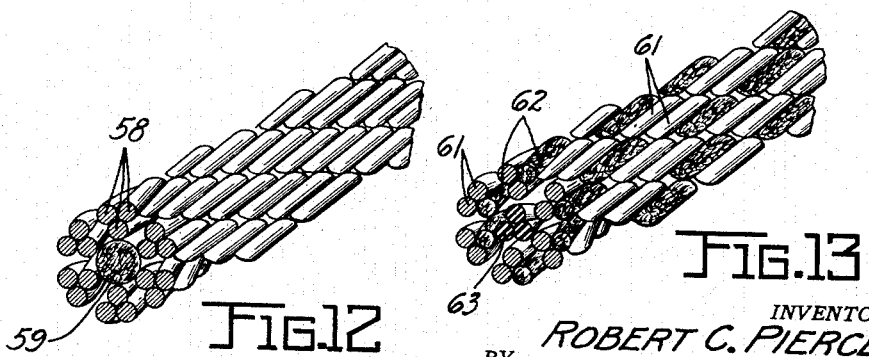
INVENTOR.
ROBERT C. PIERCE
BY Booth & MacDuff
ATTORNEY.

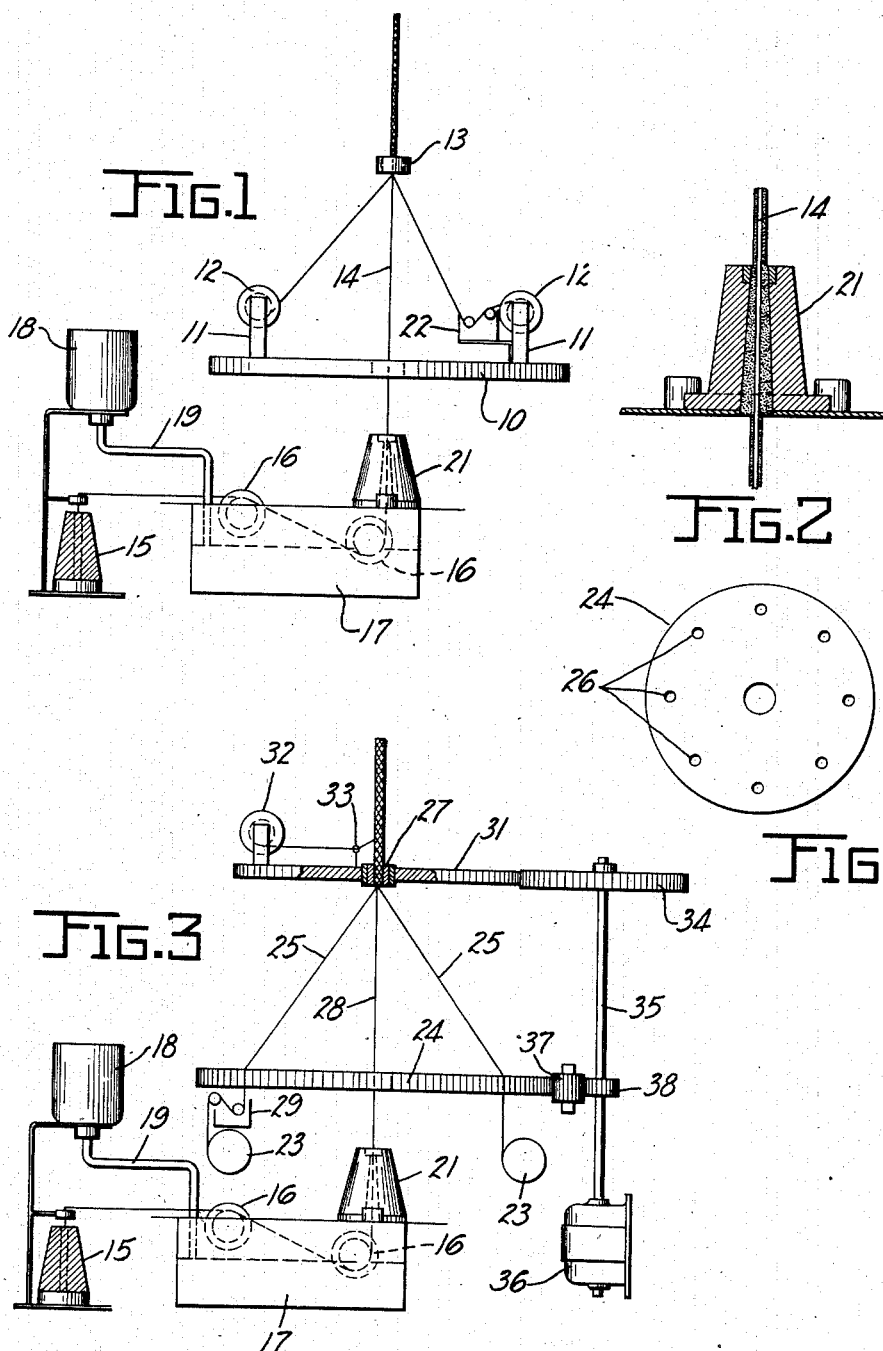

Patented Sept. 30, 1941

2,257,648

UNITED STATES PATENT OFFICE 2,257,648

REINFORCING ELEMENT AND METHOD OF MANUFACTURE

Robert C. Pierce, Niles, Mich., assignor to National Standard Company, Niles, Mich., a corporation of Michigan Application November 18, 1939, Serial No. 305,202

5 Claims. (Cl. 96—26)

This invention relates to reinforcing elements and method of making and more particularly to the manufacture of reinforcing elements made up principally of metal wires.

For the successful manufacture of reinforced articles of molded rubber or the like it is essential that a good bond be obtained between the reinforcement and the rubber or other material of which the article is formed. It is possible with the use of metal reinforcements to obtain a chemical bond between the metal and the rubber, which is of assistance in securing the reinforcement in place in the rubber. This bond, however, may not be sufficient for severe service, especially under conditions giving rise to heating in the article.

It is accordingly one object of the invention to provide a reinforcing element for rubber or like articles which may be bonded to the rubber mechanically as well as chemically. Preferably the reinforcing element is formed of elongated strands so arranged that the rubber may bond to itself around and between the strands.

Another object of the invention is to provide a reinforcing element for rubber or like articles formed of strands arranged in tubular array. The strands may, if desired, be arranged around a core or without a core.

Still another object of the invention is to provide a tubular reinforcing element formed of metal wires and including one or more strands of non-metallic yielding material. Preferably the non-metallic strands are impregnated or coated with bonding material which will be carried into the rubber article to facilitate bonding of the rubber to the reinforcing element.

Other objects of the invention relate to methods of making the reinforcing elements simply, efficiently and cheaply.

The above and other objects, advantages and novel features of the invention will be apparent from the following description when read in connection with the accompanying drawings, in which:

Figure 1 is a diagrammatic view of a machine for making reinforcing elements according to the present invention;

Figure 2 is an enlarged sectional view of the coating or impregnating die;

Figure 3 is a view similar to Figure 1 of a different type of machine;

Figure 4 is a plan view of the guide plate of Figure 3;

Figure 5 is a partial side view of one reinforcing element embodying the invention;

Figure 6 is a transverse section of the element of Figure 5;

Figure 7 is a view similar to Figure 5 of another reinforcing element;

Figure 8 is a section of the element of Figure 7;

Figures 9, 10 and 11 are views similar to Figures 5 and 7 of other reinforcing elements; and Figures 12 and 13 are perspective views of still other reinforcing elements.

Each of the several reinforcing elements illustrated is made up of a plurality of strands arranged around a core either in substantial parallelism or interwoven to form a tubular braid. The cores may be either round or flat, and in some cases, may be omitted, either by removal after formation of the element or by direct formation of the element without the presence of a core.

In each element, at least a pair of the strands and/or the core are made up of metal wires. Preferably the wires are of high strength steel of the order of .006" in diameter and may be coated with zinc and copper or with bonding lacquer to facilitate bonding to rubber.

In some cases it is highly desirable to incorporate into the elements one or more strands of non-metallic yielding material which serve to cushion the metal wires and which may also serve to carry bonding material. Such non-metallic strands may be of rubber, synthetic rubber or other plastic or fibrous material such as cotton, hemp, linen, rayon, wool, silk, jute, sisal or the like. The strands are preferably impregnated or coated with bonding material such as latex or rubber cement, but any material which will increase the tendency of rubber to bond may be used.

One method of forming elements, particularly of the type shown in Figures 5 to 9, is illustrated in Figures 1 and 2. In these figures there is shown a braiding machine comprising a table 10 formed with tracks to guide a series of carriers 11 in substantially circular paths. Some of the carriers travel in one direction and some in the other and their paths periodically cross to form a tubular braid as is well understood in the braiding art. Each carrier 11 carries a spool 12 of strand material and the strands are braided together and are drawn through a fixed die 13 in the form of a tubular braid.

In case the braid is to be formed around a core, a core strand 14 may be fed through an opening in the center of the plate 10 and through the center of the die 13. The core strand is supplied from a spool 15 and, if it is to be impregnated or coated with bonding material, may be led over pulleys 16 through rubber cement or latex in a tank 17. The bonding material is supplied to the tank 17 from a reservoir 18 having a feed pipe 19 terminating at the desired level in the tank.

After passing through the bonding material, the core strand is led through a die 21. As best seen in Figure 2, the die 21 comprises a block formed with an upwardly tapering hole therein through which the core strand is drawn.

The core strand enters the die with bonding material adhering to it and the die serves to press the bonding material into the strand and to distribute the material evenly over the surface thereof so that the strand leaves the die in a uniformly coated or impregnated condition.

When one or more of the strands on spools 12 is of non-metallic yielding material it is preferred that such strands be coated or impregnated with bonding material prior to the braiding operation. For this purpose tanks 22 may be secured to the corresponding carriers 11 and the strands may be led through bonding material in the tanks 22 before being braided. Since nonmetallic strands in the braid itself are fully exposed in the finished braid, they may, if desired, be coated with bonding material subsequent to the braiding operation by dipping, spraying or otherwise covering the finished braid with this material.

The die 13 is dimensioned so as to squeeze the braid tightly around the core as it is drawn through the die. This action tends to press the braided strands into the core and to squeeze bonding material from the core around and between the strands, covering the strands and filling the spaces between them. By using a relatively large quantity of bonding material and a relatively high pressure in the die, it is possible substantially to fill the spaces between the braided strands so that the finished element presents a relatively smooth outer surface.

Figures 3 and 4 illustrate more particularly the method of making reinforcing elements of the type shown in Figures 10 and 11. According to this method a plurality of spools 23 are carried by a plate 24 and strands 25 from the spools are led through a series of annularly arranged guide openings 26 in the plate. The strands 25 are drawn together through a fixed die 27 through which they pass in annular array in parallel.

When a core strand is used as shown at 28, it is led through a central opening in the plate 24 and through the center of the die 27 so that the strands 25 are pressed around it by the die 27. The core, if of non-metallic material, may be coated in the same way as the core of Figure 1 and coating parts identical with those in Figure 1 have been indicated by the same reference numerals in Figure 3. Also when some of the strands 25 are of non-metallic material they may be coated by being led through tanks 29 carried by the plate 24.

In some cases the bonding material may be sufficient to hold the strands 25 in place on the core, but preferably a binding strand is wound around the completed element. For this purpose a flat gear 31 is rotatably mounted around the die 27 and carries a spool 32 which provides a source of binding strand. The binding strand, preferably a light fibrous thread, is led from the spool through a guide eye 33 and then around the reinforcing element as the latter leaves the die. To wrap the binding strand around the element the gear 31 is rotated as the element is drawn through the die by means of a gear 34 on a shaft 35 which is driven by a motor 36.

In the event it is desired to give the strands 25 a twist around the core, the plate 24 may be rotatably mounted and may be formed on its periphery with gear teeth. An idler pinion 37 meshes with these gear teeth and with a pinion 38 on the shaft 35, the idler being provided so that the twist in the strands will be in the opposite direction from that in which the binding strand is wound on.

Figures 5 and 6 illustrate one type of reinforcing element formed by the method of Figures 1 and 2 comprising a braid of metal wires 41 around a core 42. The core is shown as formed of twisted fibrous strands but a metal core or one formed of any of the non-metallic yielding materials mentioned above might be used. As best seen in Figure 6 the wires 41 are partially covered and the spaces between them are partially filled with binding material so as to provide a substantially smooth outer surface. It will be understood that the degree of filling of the braid can be controlled by varying the amount and character of binding material employed and the pressure of the wires against the core.

In utilizing the reinforcing elements they may be molded or calendered into the rubber or like material from which the articles are to be formed. During the molding or calendering operation, or the subsequent vulcanizing or curing operations, the wires of the braid and the core will adhere to the rubber material, this being facilitated by the presence of the bonding material. Thus in the completed article the wires themselves are chemically bonded to the rubber and the rubber is bonded through the spaces between the wires and around the wires to the core, so that a strong mechanical bond or interlock is formed between the rubber and the wire braid structure. This bond insures that the reinforcing elements will be maintained in place regardless of stresses placed on the articles. Due to the fact that the braid structure is highly flexible, and in addition, is resilient in both tension and compression, the reinforcing elements are especially advantageous for use in flexible articles which are subjected to bending or flexing during use.

When the reinforcing element is used without a core, the rubber of the article will flow around and between the wires and will bond to itself in the center of the element. If a relatively thin rubber composition is employed the center part of the element may fill so that the element remains substantially round. However, if a stiffer composition is used or if the elements are calendered under a relatively high pressure, the elements may be flattened with the rubber bonding to itself between the flattened sides. If flattening is desired it may be insured by flattening the elements before placing them in the rubber.

Figures 7 and 8 illustrate a similar construction formed of metal wires 44 braided around a flat core 45 shown as being formed of rubber or the like. The spaces between the wires are at least partially filled with bonding material, as shown at 46. The flat core 45 may be formed of strips of rubber or the like, as shown, or of strips of cloth woven from fibrous or wire strands or of fibrous or wire strands bonded together in parallel. The element of Figures 7 and 8 may be used in the same manner as that of Figure 5, and possesses the same advantages.

Figure 9 illustrates another form of reinforcing element comprising a braid formed of wires 47 and strands 48 of non-metallic yielding material. A core 49 of fibrous material is shown in this braid and preferably both the core and the non-metallic strands 48 are impregnated or coated with bonding material. The strands 48 serve to cushion the wires 47, and in addition, carry bonding material to facilitate bonding of the element to rubber.

The reinforcing element of Figure 10 includes a core 51 shown as formed of fibrous material around which are laid in annular array, a series of metal wires 52 alternating with non-metallic strands 53. The wires and strands may be held in place on the core by a binding strand 54 wrapped spirally around the element. Preferably both the core 51 and the non-metallic strands 53 are coated or impregnated with bonding material.

In placing this element in a rubber article the rubber will bond to the wires 52 and the strands 53, and will bond around and between the wires and strands to the core due to the presence of the bonding material. This will form a very strong bond between the reinforcing element and the rubber of the article.

The element of Figure 11 is similar to that of Figure 10 and includes a core 55 shown as being formed of rubber or like plastic with a series of metal wires 56 and non-metallic strands 57 extending spirally about the core. Due to the spiral arrangement the binding strand may be omitted if desired. Preferably both the core and the non-metallic strands 56 are impregnated or coated with bonding material to assist in bonding the element to the rubber.

Figure 12 illustrates another construction formed of a plurality of strands each comprising three metal wires 58 twisted together with the several strands twisted spirally around a core 59. The core is shown as being of fibrous material, although any other material might be employed. The core is preferably impregnated with bonding material, so that when the reinforcing element is placed in a rubber article the rubber will flow around and between the strands and will bond to the core thus providing a strong mechanical bond, in addition to the chemical bond between the wires and the rubber.

Figure 13 illustrates a construction substantially similar to that of Figure 12 except that each strand is made up of a series of metal wires 61 and strand 62 of non-metallic yielding material. The twisted strand so formed extends spirally about a core 62 shown as being formed of three metal wires twisted together. The non-metallic strands 62 carry bonding material to facilitate bonding of the element to rubber and when placed in a rubber article the rubber will bond to the wires and to itself around and between the wires.

The elements of Figures 12 and 13 may be formed by first impregnating the non-metal strands or core structures and then twisting the several strands together in the manner of forming the usual wire rope construction. During the twisting operation the bonding material carried by the core or by the non-metallic strands will be spread at least partially over the surfaces of the wires so that they may bond more readily to the rubber.

While several embodiments of the invention have been shown and described in detail and while several methods of carrying out the invention have likewise been described it is to be understood that the illustrations and detailed description are not to be taken as a definition of the scope of the invention, reference being had for this purpose to the appended claims.

What is claimed is:

1. A reinforcing element for rubber or like articles comprising an elongated core of non-metallic yielding material, and a tubular braid of metal wires around said core, the core carrying bonding material and the wires of the braid pressing against the core so as to be at least partially covered with the bonding material, said element being longitudinally resilient to yield during flexing of a reinforced article.

2. A reinforcing element for rubber or like articles comprising an elongated core of non-metallic yielding material, and a series of strands extending diagonally around the core and passing over and under each other to form a tubular braid, some of said strands being of non-metallic yielding material and others being formed by metal wires, the non-metallic strands and the core carrying bonding material, said element being longitudinally resilient to yield during flexing of a reinforced article.

3. A reinforcing element for rubber or like articles comprising a series of strands arranged in the form of a tubular braid with each strand extending angularly around the braid and over and under other strands, at least one of said strands being of non-metallic yielding material carrying bonding material and the other strands being metal wires, said element being longitudinally resilient to yield during flexing of a reinforced article.

4. The method of forming reinforcing elements for rubber or like articles which comprises feeding an elongated non-metallic core lengthwise, coating said core with bonding material in a plastic state, feeding a plurality of metal tension members around the core, and pressing the tension members against the core so as to force the bonding material out between the tension members to form an element with a substantially smooth outer surface.

5. The method of forming reinforcing elements for rubber or like articles which comprises feeding an elongated non-metallic core lengthwise, coating said core with bonding material in a plastic state, feeding a plurality of metal tension members around the core, and crossing the tension members over and under each other as they are so fed to form a tubular braid, the tension members when braided pressing against the core so as to force the bonding material out between the tension members to form an element with a substantially smooth outer surface.

ROBERT C. PIERCE.